3,147,119
PHOTOPOLYMERIZATION OF VINYL MONOMERS WITH METAL OXIDES AS CATALYSTS

Helene D. Evans, Blackwood, N.J., and Fritz W. H. Mueller, Binghamton, and Steven Levinos, Vestal, N.Y., assignors to General Aniline & Film Corporation, New York, N.Y., a corporation of Delaware
No Drawing. Filed May 18, 1962, Ser. No. 195,998
14 Claims. (Cl. 96—115)

The present invention relates to the formation of hard solid polymers by photopolymerizing or copolymerizing normally liquid or solid monomeric vinyl compounds while employing as the catalysts for photopolymerization a metal oxide such as zinc oxide or titanium dioxide or such oxides the catalytic effect of which is promoted by certain organic dyes and to light-sensitive materials containing such monomer and catalyst in a colloidal carrier.

Application Serial No. 715,528, now Patent No. 3,075,907, filed February 15, 1958, by Steven Levinos, discloses that monomeric compounds containing a vinyl group can be photopolymerized by radiations having a wave length from $10^{-4}$ to $10^{-10}$ centimeters to yield solid products while employing as the catalyst radiation-sensitive silver compounds.

Application Serial No. 731,538, now abandoned, by Steven Levinos and Fritz W. H. Mueller, suggests that the catalysts for such photopolymerization be light-sensitive silver halide emulsions, whereas application Serial No. 765,275, now Patent No. 3,050,390, by the same parties, proposes the use as catalysts for such photopolymerization of light-sensitive silver compounds promoted by amphoteric metal oxides.

It has now been discovered that normally liquid to solid vinyl monomers may be photopolymerized in bulk or in coated dry layers with UV light or light of the visible spectrum while employing as the catalyst zinc oxide or titanium dioxide, the catalytic activity of which is promoted by certain organic dyes. Such method of photopolymerization and light-sensitive materials comprising a base coated with an ethylenically unsubstituted monomer containing the grouping CH=CH=, including vinyl and vinylidene monomers, the aforestated catalyst and a colloidal carrier constitute the purposes and objects of the present invention.

The exact mechanism according to which these catalysts induce photopolymerization in bulk or when suitably coated and dried on supports such as metal, paper, glass, film or the like, is not completely understood, but it is assumed that it involves free radicals in one form or another. Redox reactions do occur in ultraviolet light or visible light irradiated suspensions of zinc oxide or titanium dioxide. Since certain Redox reactions can cause photopolymerization of vinyl compounds, it is plausible to explain the conversion of light energy into chemical energy in this manner in view of the fact that we have observed that a trace of moisture is essential to promote photopolymerization. In any case, when zinc oxide or titanium dioxide dispersions alone or in combination with the aforesaid promoters in suitable matrices containing a vinyl monomer are coated on suitable supports and exposed under a negative or stencil, imagewise photopolymerization of the vinyl monomer ensues in such a manner that a sharp photoresist remains after the unpolymerized, unexposed areas are removed by washing. Similarly, vinyl monomers in the presence of water and such metal oxide catalysts are photopolymerized in bulk to hard solid monomers in short periods of time when irradiated with UV or visible light. Imagewise photopolymerization involving the aforesaid catalysts is useful in the preparation of photolithographic printing plates, rotogravure cylinders, printed circuits, preparation of microfilm and other print materials comparable to silver halide photographic paper and image transfer papers.

It has been explained that zinc oxide or titanium dioxide are per se capable of photopolymerizing vinyl monomers when irradiated with UV or visible light. It may be noted, in this connection, that very good results are also obtained when using as the titanium dioxide, the product precipitated from titanium tetra ethylate according to the procedure of H. Knoll et al., "Naturwissenschaften," vol. 45, No. 11, page 262, 1958, and the examples should be construed in this light.

The catalytic activity of the zinc oxide or titanium dioxide, however, is greatly promoted when they are used in combination either for bulk photopolymerization or for imagewise photopolymerization with sensitizing organic dyestuffs.

It is known that certain oxides, such as zinc oxide or titanium dioxide can be optically sensitized with small quantities of organic dyes. In our work, we discovered that the ability of zinc oxide and titanium dioxide to catalyze the photopolymerization of vinyl monomers is greatly promoted by the use of such dyes as amino fluorimes, hydroxy fluorimes and hydroxy fluorones in which the unsaturated carbon atom linking the two benzo rings is substituted by a phenyl radical and thiazines. Examples of such compounds are eosin, fluorescin, erythrosin, Rose Bengal, rhodamine B, methylene blue or the like. This optical sensitization through organic dyes, which is analogous to optical sensitization of silver halides, is distinctly different from the photoreduction described in the prior art, as will be subsequently explained.

The quantity of metal oxide used in the photopolymerization may range from about 1% to 200% by weight of the monomer employed. Larger amounts may, of course, be used, but no improvement in result follows from the larger amount. As a matter of fact, in bulk photopolymerization, excesses of metal oxides will settle out from a water solution of the components and, therefore, such excesses should be avoided.

The quantity of the promoter as compared to the metal oxide covers a broad range. Thus, we have used as little as 0.0005 g. of the promoter per gram of oxide and as much as 0.5 g. of the promoter per gram of oxide. In each case, effective photopolymerization to hard solid polymers was realized.

Any normally liquid to solid monomeric compound containing the grouping CH=CH=, or mixtures thereof, may be used in our procedure. Suitable monomers are, for example, acrylamide, acrylonitrile, N-ethanol acrylamide, methacrylic acid, acrylic acid, calcium acrylate, methacrylamide, vinyl acetate, methylmethacrylate, methylacrylate, ethylacrylate, vinyl benzoate, vinyl pyrrolidene, vinylmethyl ether, vinylbutyl ether, vinylisopropyl ether, vinylisobutyl ether, vinylbutyrate, butadiene or mixtures of ethylacrylate with vinyl acetate, acrylonitrile with styrene, butadiene with acrylonitrile and the like.

It is recognized that the molecular weight and hence the ultimate hardness of a vinyl polymer can be increased by utilization during polymerization of a small amount of an unsaturated compound containing at least two terminal vinyl groups, each linked to a carbon atom in a straight chain or in a ring. The compounds serve to cross-link the polyvinyl chains and are generally designated as cross-linking agents. Such agents are described, for example, by Kropa and Bradley in vol. 31, No. 12, of "Industrial and Engineering Chemistry," 1939. Among such cross-linking agents for our purpose may be mentioned N,N'-methylene-bis-acrylamide, triallyl cyanurate, divinyl benzene, divinyl ketones and diglycol-diacrylate.

The cross-linking agent is generally employed in an amount ranging from 10 to 50 parts of monomer to each part of the cross-linking agent. It is understood that the greater the quantity of cross-linking agent within such range, the harder the polymer obtained. In certain instances, it may be desirable to use only the above cross-linking agents and exclude other monomers.

Bulk polymerization is usually carried out in a water or organic solvent solution of the monomer. The metal oxides should be dispersed in the solvent solution of the monomer and if the solution be aqueous, it is recommended that a dispersing agent be employed, such as those described in application Serial No. 715,528. This will operate to prevent to a large etxent the settling out of the metal oxide. If an organic solvent system is used, provisions must be made for the presence in the system of a small quantity of water, say about .1 to 5% by weight. The water may be added as such or may be supplied by incorporating in the reaction mixture a humectant such as ethylene glycol, glycerin or the like. When these substances are present, say in an amount of a few percent by weight of the mixture, they absorb water from the atmosphere to permit photopolymerization to proceed.

Coatings are prepared by dispersing the oxide in a colloidal carrier along with the monomeric compound and the promoter for the oxide, if such be used. To facilitate coating, dispersing agents such as saponin or those mentioned in application Serial No. 715,528 may be utilized. A humectant such as glycerin or glycol is preferably added.

It has been explained that optical sensitization of the zinc oxide or titanium dioxide involves a mechanism distinct from that described in the prior art such as Oster, "Journal of Photographic Engineering," 1933. Thus, it is considered that the sensitizing dyes are photo-oxidized rather than photoreduced. As a matter of fact, our system must be devoid of reducing agents. The following experiments were conducted:

two dyes—erythrosin and Methylene Blue—were irradiated in the presence and absence of titanium dioxide with light of a wave length of 365 m$\mu$ which is absorbed by the oxide, but not by the dye. Ultraviolet and visible spectra were obtained from these samples as well as of the oxidized and reduced (leuco) forms of the dyes. The spectra indicated that extensive photobleaching of the dyes occurred only in the presence, but not in the absence, of titanium dioxide. Furthermore, there was no evidence that the leuco forms of the dyes were produced. Finally, the bleached samples of the dyes were not restored to their original color by oxidizing agents. We conclude, therefore, that irradiation with light of zinc oxide or titanium dioxide sensitized with the involved dyes leads to irreversible oxidation. This mechanism indicates that our system is not predicated on photoreduction, but rather on photo-oxidation.

The invention will be illustrated by the following examples, but it is to be understood that the invention is not restricted thereto.

*Example I*

The following composition was prepared:

| | G. |
|---|---|
| Acrylamide | 180 |
| N,N'-methylene-bis-acrylamide | 7 |
| Water | 120 |

To 6 cc. of this mixture were added about 100 mg. of zinc oxide. The mixture confined in a test tube was exposed to the light of a 150 watt tungsten lamp at a distance of 6". Photopolymerization to a solid mass ensued in a period of 17 minutes.

*Example II*

To the mixture of Example I there were added 4 drops of a .1% aqueous solution of Rose Bengal. Upon irradiation of the mixture under the conditions of Example I, photopolymerization to a solid mass ensued in a period of 8½ minutes. The dye was essentially decolorized or bleached.

*Example III*

To 5 cc. of the composition of Example I were added 25 mg. of zinc oxide. The mixture was confined in a test tube and exposed to the light of a 150 watt tungsten lamp at a distance of 6". Photopolymerization ensued in a period of 13½ minutes.

*Example IV*

To 5 cc. of the composition of Example I were added 25 mg. of titanium dioxide and the mixture irradiated as in Example III. Photopolymerization ensued in a period of 19 minutes.

*Example V*

The following composition was prepared and will hereinafter be referred to as W–5:

| | G. |
|---|---|
| Acrylamide | 180 |
| N,N'-methylene-bis-acrylamide | 7 |
| Water | 120 |

Coatings were prepared on a hardened gelatin layer on film using the following formulation:

| | |
|---|---|
| 10% gelatin | 450 ml. |
| Titanium | 60 g. in 60 ml. of water. |
| W–5 | 90 ml. |
| Saponin 8% | 7.2 ml. |
| Glycerin | 3 ml. |

To 25 g. of the suspension were added before coating, 5 ml. of a solution containing the quantities of promoter as indicated below. Each 30 g. of the coating suspension or "solution" contained 2.5 g. of oxide. The ratio R represents the weight of dye to the weight of oxide. For example, $R=1$ to 500 means that there is 5 milligrams of dye for each 2.5 g. of titanium dioxide. A number of coatings were prepared and exposed through a pattern for different time intervals to a tungsten lamp (375 watt) at 30". The speeds indicate the minimum amount of time required to obtain a sharp relief image. The relief was obtained by washing away the unpolymerized parts of the emulsion.

| | |
|---|---|
| Promoter | Rose Bengal |
| Ratio of dye to titanium dioxide | 1 to 500 |
| Time of photopolymerization | 4 seconds |

A similar coating omitting the Rose Bengal required 15 minutes to obtain the sharp relief image by photopolymerization.

*Example VI*

The procedure was the same as in Example V, excepting that the ratio of dye to titanium dioxide was 1 to 1,000. In this case, photopolymerization required 5 seconds.

*Example VII*

The procedure was the same as in Example V, excepting that the ratio of dye to titanium dioxide was 1 to 100. In this case, photopolymerization to produce the sharp relief image required 2½ seconds.

*Example VIII*

The procedure was the same as in Example V, excepting that the titanium dioxide was replaced by zinc oxide 2.5 g.) and the ratio of the Rose Bengal to the oxide was 1 to 330. Photopolymerization to the desired relief image required 5 seconds.

*Example IX*

The procedure was the same as in Example V, excepting that the titanium dioxide was replaced by 2.5 g. of zinc oxide and the Rose Bengal was omitted. Photopolymerization to the desired relief image required 15 minutes.

*Example X*

The procedure was the same as in Example V, excepting that the Rose Bengal was replaced by 5 mg. of Methylene Blue per 30 g. of the coating solution. Photopolymerization required 15 seconds. In the same system, without the titanium dioxide, the photopolymerization required more than 15 minutes.

Example XI

The procedure was the same as in Example X, excepting that the Methylene Blue was replaced with the same amount of eosin. Photopolymerization required 15 seconds. In the same system, without the titanium dioxide, the photopolymerization required more than 15 seconds.

Example XII

The procedure was the same as in Example X, excepting that the Methylene Blue was replaced by 10 milligrams of erythrosin. Photopolymerization required 2½ seconds.

Example XIII

The procedure was the same as in Example V, excepting that the titanium dioxide was replaced by 5 g. of zinc oxide and the Rose Bengal by the same amount of Rhodamine B. Photopolymerization required 3 seconds.

The same results were obtained when replacing Rhodamine B by Methylene Blue, fluorescein or by erythrosin.

Example XIV

A composition was prepared as follows:

| | |
|---|---|
| Acrylic acid _____ml__ | 5 |
| Zinc oxide _____mg__ | 25 |

By irradiating this composition confined in a test tube as in Example I, photopolymerization occurred in a matter of minutes.

Example XV

The procedure was the same as in Example XIV, excepting that the zinc oxide was replaced by the same amount of titanium dioxide. The results were similar to those of Example XIV.

Example XVI

The procedure was the same as in Example XIV, excepting that the acrylic acid was replaced by 2 ml. of a 20% aqueous solution of calcium acrylate. Photopolymerization ensued in a relatively short time.

Example XVII

The procedure was the same as in Example V, excepting that the acrylamide was replaced by calcium acrylate. The results were similar to those obtained in Example V.

Example XVIII 10 g. N-tertiary-butyl acrylamide were dissolved in 30 g. of a 10% aqueous solution of ethyl cellulose and toluene.

1 g. of a dispersing agent—lauryl sulfate—was added and in this oily solution, 4 to 5 g. of zinc oxide were dispersed. The solution was placed in a reactor and exposed using the technique of Example I. Photopolymerization occurred in a matter of minutes yielding a solid hydrophobic polymer.

Example XIX

A composition was prepared from the following components:

| | |
|---|---|
| Acrylamide _____g__ | 180 |
| N,N'-methylene-bis-acrylamide _____g__ | 7 |
| Water _____cc__ | 120 |
| Zinc oxide _____g__ | .02 |

To 1 cc. of this composition, there were added 1 cc. of a 10% dispersion of vinyl acetate and 1 cc. of an aqueous solution containing 5 mg. of Rose Bengal. Irradiation of this composition to the light of a 500 watt tungsten lamp at a distance of 5" caused photopolymerization to ensue in a period of a few minutes.

Example XX

A composition was prepared from the following components:

| | |
|---|---|
| Acrylamide _____g__ | 180 |
| N,N'-methylene-bis-acrylamide _____g__ | 7 |
| Water _____cc__ | 120 |

To 6 cc. of this solution were added 1 g. of acrylonitrile, .02 g. of zinc oxide and 5 mg. of Rose Bengal. By irradiating the composition at a distance of 6" from the light source while utilizing a 500 watt tungsten lamp, rapid photopolymerization occurred.

Example XXI 1 g. of vinyl acetate was dispersed in water to produce a 1% dispersion. To this composition were added .02 g. of zinc oxide and 3.6 mg. of Methylene Blue. By irradiating the composition with the light source of Example XX at a distance of 5", photopolymerization occurred in a matter of seconds.

Example XXII

The following composition was prepared:

| | g. |
|---|---|
| Methacrylamide _____ | 50 |
| N,N'-methylene-bis-acrylamide _____ | 4 |
| Water _____ | 7 |

To this composition there were added .02 g. of titanium dioxide and 10 mg. of Rose Bengal.

The composition was irradiated with a 150 watt tungsten lamp at a distance of 6". The mass polymerized after an exposure of a few seconds.

Example XXIII 5 g. of styrene were dissolved in 2.5 g. of a 10% solution of ethyl cellulose and toluene. After the addition of 3 drops of a 25% solution of lauryl sulfate, .02 of titanium dioxide and 10 mg. of fluorescein were dispersed with the aid of a Waring Blender. The composition was placed in a reactor and exposed while using the technique of Example XX. Photopolymerization occurred in a matter of minutes yielding a solid hydrophobic polymer.

Modifications of the invention will occur to persons skilled in the art. Thus, in lieu of any of the monomers mentioned in the examples, we may use any of the vinyl monomers mentioned above. Similarly, catalytic systems other than those of the examples using the combinations specified may be employed. We, therefore, do not intend to be limited in the patent granted except as necessitated by the appended claims.

We claim:

1. A light-sensitive photographic material comprising a base coated with a colloidal carrier containing a normally liquid to solid dispersible monomer containing the grouping $CH_2=C=$ and a white light-sensitive catalyst capable of inducing photopolymerization of said monomer, said catalyst comprising a mixture of the following two components:
   (a) A member of the group consisting of zinc oxide and titanium dioxide; and
   (b) A member of the group consisting of amino fluorimes, hydroxy fluorimes, and hydroxy fluorones, in which the carbon atom linking the two benzo rings carries a phenol substituent, and of thiazine dyes.

2. The light-sensitive photographic material of claim 1 wherein the catalyst is zinc oxide in admixture with Rose Bengal.

3. The light-sensitve photographic material of claim 1 wherein the catalyst is titanium dioxide in admixture with Methylene Blue.

4. The light-sensitive photographic material of claim 1 wherein the catalyst is a mixture of titanium dioxide and Rose Bengal.

5. The light-sensitive photographic material of claim 1 wherein the catalyst is a mixture of zinc oxide and Methylene Blue.

6. The light-sensitive photographic material of claim 1 wherein the catalyst is a mixture of titanium dioxide and erythrosin.

7. The process of producing high molecular weight solid polymers from monomeric vinyl compounds which comprises subjecting a normally liquid to solid monomer having the grouping $CH_2=C=$ to photopolymerization by exposing the monomer to a light source ranging in length from those of the UV to the visible spectrum in the presence of a white light-sensitive catalyst capable of inducing photopolymerization of said monomer, said catalyst comprising a mixture of the following two components:

(a) A member of the group consisting of zinc oxide and titanium dioxide; and (b) A member of the group consisting of amino fluorimes, hydroxy fluorimes, and hydroxy fluorones, in which the carbon atom linking the two benzo rings carries a phenol substituent, and of thiazine dyes.

8. The process as defined in claim 7 in which the catalyst is a mixture of titanium dioxide and Rose Bengal.

9. The process as defined in claim 7 in which the catalyst is a mixture of zinc oxide and Methylene Blue.

10. The process as defined in claim 7 in which the catalyst is a mixture of titanium dioxide and Methylene Blue.

11. A printing plate comprising a base coated with a light-sensitive photographic emulsion comprising a colloidal carrier containing a normally liquid to solid monomer having the grouping $CH_2=C=$ and a light-sensitive catalyst capable of inducing photopolymerization of said monomer, said catalyst comprising a mixture of the following two components:

(a) A member of the group consisting of zinc oxide and titanium dioxide; and (b) A member of the group consisting of amino fluorimes, hydroxy fluorimes, and hydroxy fluorones, in which the carbon atom linking the two benzo rings carries a phenol substituent, and of thiazine dyes.

12. A printing plate as defined in claim 11 wherein said catalyst is a mixture of zinc oxide and Rose Bengal.

13. A printing plate as defined in claim 11 wherein said catalyst is a mixture of titanium dioxide and Methylene Blue.

14. A printing plate as defined in claim 11 wherein said catalyst is a mixture of titanium dioxide and Rose Bengal.

References Cited in the file of this patent

UNITED STATES PATENTS

| | | |
|---|---|---|
| 2,367,660 | Agre | Jan. 23, 1945 |
| 2,367,661 | Agre | Jan. 23, 1945 |
| 2,413,973 | Howk et al. | Jan. 7, 1947 |
| 2,435,429 | Evans et al. | Feb. 3, 1948 |
| 2,480,749 | Marks | Aug. 30, 1949 |
| 2,491,409 | Kropa et al. | Dec. 13, 1949 |
| 2,500,023 | Burk | Mar. 7, 1950 |
| 2,875,047 | Oster | Feb. 24, 1959 |
| 2,924,561 | Schmerling | Feb. 9, 1960 |
| 2,947,716 | Cornell et al. | Aug. 2, 1960 |
| 3,050,390 | Levinos | Aug. 21, 1962 |

OTHER REFERENCES

Young et al.: RCA Review, vol. 15, No. 4, December 1954, pp. 469–484.